United States Patent [19]

Lamonte

[11] Patent Number: 4,957,996

[45] Date of Patent: Sep. 18, 1990

[54] PREPARATION OF POLYARYLATE OF IMPROVED COLOR WITH COBALT SALT

[75] Inventor: Ronald R. Lamonte, Flanders, N.J.

[73] Assignee: Hoechst Celanese Corporation, Somerville, N.J.

[21] Appl. No.: 256,408

[22] Filed: Oct. 12, 1988

[51] Int. Cl.$^5$ ............................................. C08G 63/32
[52] U.S. Cl. ..................................... 528/181; 528/176; 528/179; 528/180
[58] Field of Search ......................... 528/181, 180, 179

[56] References Cited

U.S. PATENT DOCUMENTS 4,319,017  3/1982  Kosanovich et al. ............... 528/176

*Primary Examiner*—Harold D. Anderson
*Attorney, Agent, or Firm*—Depaoli & O'Brien

[57] ABSTRACT

Improved polyarylate color is achieved by dissolving in the polyarylate-forming reaction mixture a cobalt salt of an ester of a $C_3$ to $C_{20}$ aliphatic or iso-aliphatic hydrocarbon. The cobalt salt is preferably predissolved prior to addition to the reaction mixture.

21 Claims, 2 Drawing Sheets

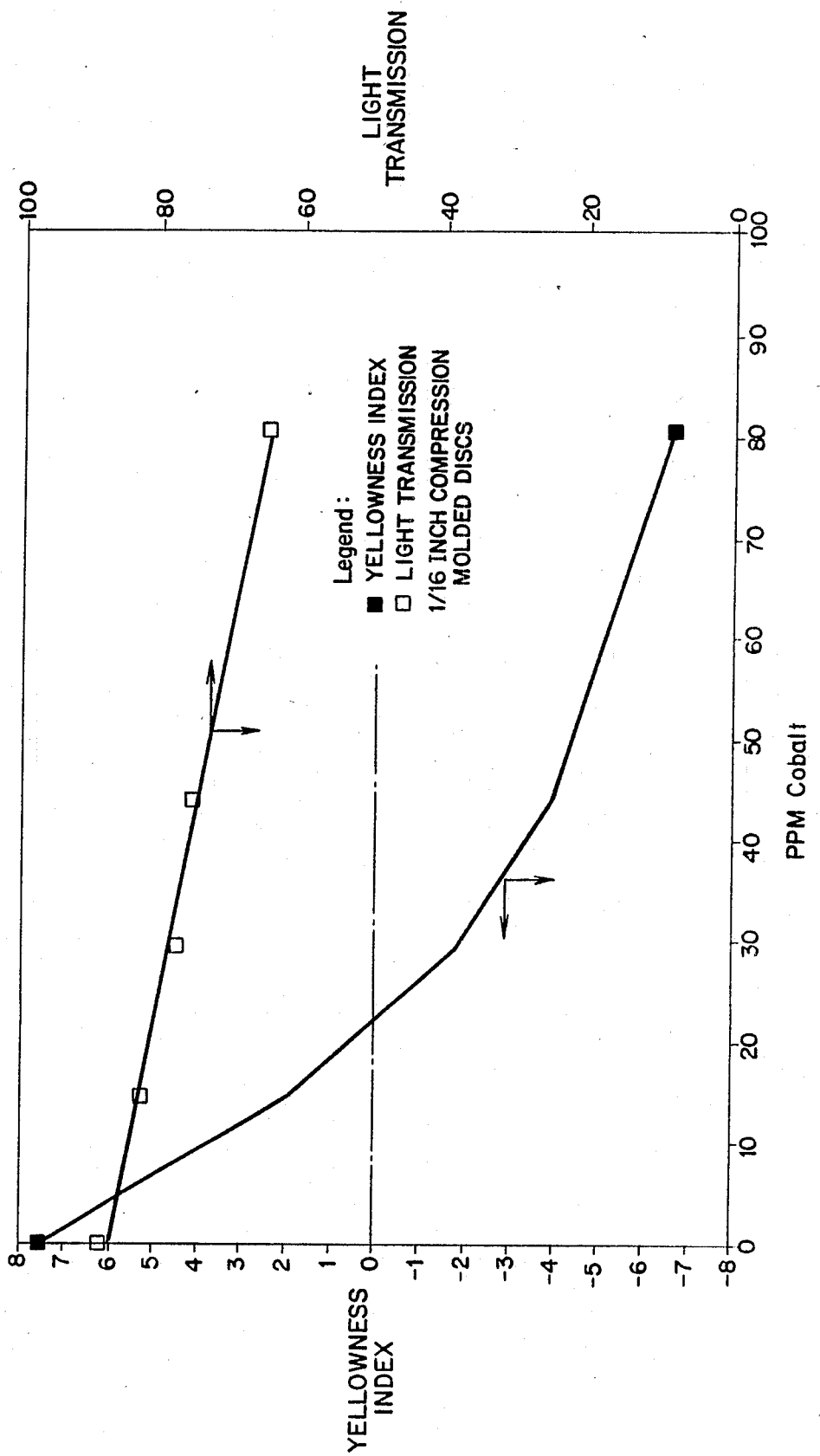

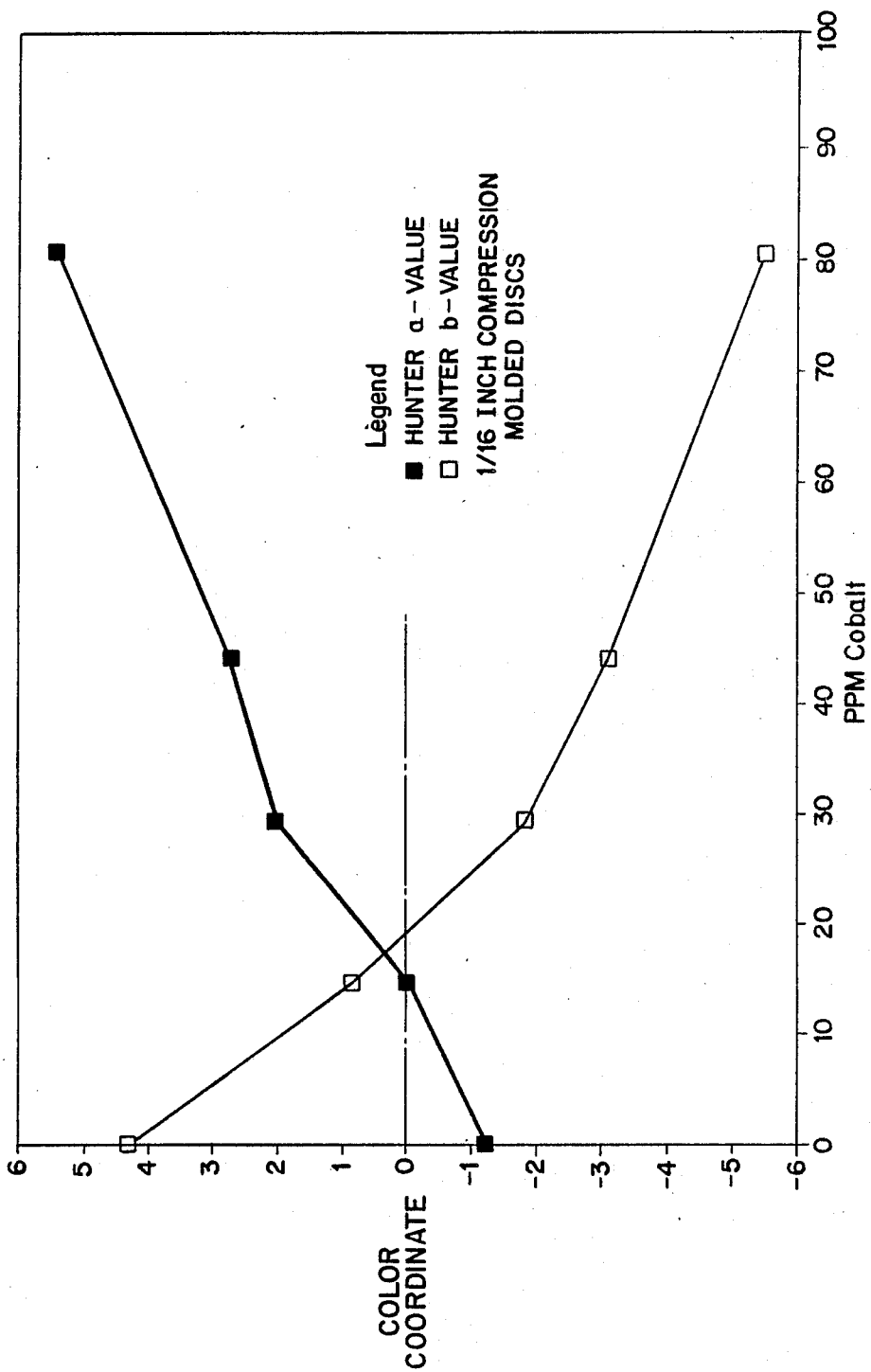

PREPARATION OF POLYARYLATE OF IMPROVED COLOR WITH COBALT SALT

FIELD OF THE INVENTION

This invention is directed to polyarylate molding compositions having improved color, and, more particularly, to a process for improving the color, and, more particularly, to a process for improving the color of polyarylates.

BACKGROUND OF THE INVENTION

Linear aromatic polyesters prepared from dicarboxylic acids, especially aromatic dicarboxylic acids and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

A useful method of forming polyarylates comprises melt polymerization and, more particularly, melt transesterification polymerization of dialkyl or diaryl esters of aromatic carboxylic acids and bisphenols in the presence of a transesterification catalyst. However, polyarylates prepared by melt polymerization are often colored in undesirable yellow to yellow-green hues in their "as prepared" state. This coloration of the polyarylates reduces the commercial value o f the composition for use in molded articles in as much as many end uses of the molded composition or blended formulations require "water white" color. In such instances other colorants must be added to the molding composition in order to mask the yellow color of the polyarylate as formed.

An attempt has been made to improve the color of the melt-prepared polyarylates. Thus, commonly assigned, copending application, U.S. Ser. No. 068,163, filed June 30, 1987, discloses including a cobalt-containing salt in the molten polymerization mixture of monomeric components and polymerizing in the presence of a transesterification catalyst to yield polyarylate which has a blueish tint which is more commercially desirable. Cobalt salts and compounds disclosed as useful in this copending application include cobalt carbonate, cobalt benzoate, cobalt phenate and cobalt acetate. While the process disclosed therein has achieved the goal of improving the color of the polyarylate, improved coloration is an ongoing goal. Improving the color of the meltprepared polyarylate involves a balancing of complementary colors between the yellow to yellow-green of the as-prepared polymer and the cobalt-containing blueing agent. Polymer color can be objectively measured according to the Hunter scale represented by L, a, and b axes. L is a black-white scale, a is red-green and b is yellow-blue. It is preferred to obtain as close to a neutral color as possible represented by the point 100,0,0 on the Hunter scale. Additionally, the light transmission of the polyarylate must be considered and not adversely affected.

Unfortunately, it has been found that the cobalt salts mentioned above are not very soluble in the monomers, which form the molten polyarylate polymerization mixture, and often precipitate out of the phenol solvent which has been suggested for use in dissolving the salt. This lack of solubility causes the cobalt salt to be present as a dispersion in the monomeric mixture instead of uniformly mixed therein. The final product does not have greatly improved color since the solid or precipitated cobalt salt cannot provide uniform masking of the natural yellow tint of the polyarylate and often contains tiny specks of the cobalt salt as an impurity. Accordingly, there is still a need to improve the color of polyarylates in the "as prepared" state and such need forms the primary objective of the present invention.

SUMMARY OF THE INVENTION

It has now been found that cobalt salts comprising the cobalt esters of aliphatic and iso-aliphatic carboxylic acids provide improved color balance to melt-prepared polyarylates and do not adversely affect the light transmission thereof. Importantly, it has been found that the aliphatic and iso-aliphatic cobalt esters can be readily and uniformly dissolved in the mixture of monomers which form the polyarylate by predissolving the cobalt salts in a conventional solvent such as toluene. According to this invention, not only is the masking ability of the cobalt salt improved and, thus, the color of the polyarylate improved, the tiny specks which have been found in the polyarylate composition using previous cobalt salts are eliminated, providing improved overall product quality.

The aliphatic and iso-aliphatic carboxylic acids which form the useful cobalt salts of the present invention contain 3 to 20 carbon atoms.

BRIEF DESCRIPTION OF THE DRAWINGS

FIG. 1 is a graph illustrating the Yellowness Index and light transmission of a melt-prepared polyarylate relative to the amount of a cobalt octoate salt added per weight of polymer.

FIG. 2 is a graph illustrating Hunter a and b color of a melt-prepared polyarylate relative to the amount of a cobalt octoate salt added per weight of polymer.

DETAILED DESCRIPTION OF THE INVENTION

The aromatic polyester used in this invention is obtained from terephthalic acid and/or isophthalic acid and/or functional derivatives thereof and a bisphenol of the following general formula (I)

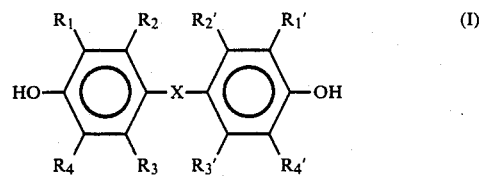

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, each is selected from the group consisting of a hydrogen atom, a chlorine atom, a bromine atom and an alkyl group containing 1 to 4 carbon atoms, or functional derivatives thereof.

A mixture of about 90 to about 10 mole % of terephthalic acid and/or a functional derivative thereof and about 10 to about 90 mole % of isophthalic acid and/or a functional derivative thereof is preferred for use as the acid component to be reacted with the bisphenol to prepare the aromatic polyester as referred to in this invention. Preferably, a mixture of 20 to 80 mole % of terephthalic acid and/or a functional derivative thereof and 80 to 20 mole % of isophthalic acid and/or a functional derivative thereof is used. The molar ratio of bisphenol to the sum of the terephthalic acid units and isophthalic acid units is substantially equimolar.

Suitable functional derivatives of terephthalic or isophthalic acid which can be used include dialkyl esters and diaryl esters. Preferred examples of dialkyl esters include dialkyl esters of terephthalic and isophthalic acids containing 1 to 6 (especially 1 to 2) carbon atoms in each alkyl moiety thereof. Preferred examples of diaryl esters include diphenyl terephthalate and diphenyl isophthalate.

Examples of suitable bisphenols of the general formula (I) above are 4,4'-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl) sulfone, bis(4-hydroxyphenyl) ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, 1,1-bis(4'-hydroxyphenyl)ethane, 2,2-bis(4'-hydroxy-3'-methylphenyl)propane, 2,2-bis(4'-hydroxy-3'-chlorophenyl (propane, 2,2-bis(4'-hydroxy-3', 5'-dichlorophenyl)propane, 2,2-bis(4'-hydroxy-3,5'-dibromophenyl)propane, and 1,1-bis(4'-hydroxyphenyl)-n-butane. 2,2-bis(4'-hydroxyphenyl)-propane, Bisphenol A, is most typical and is readily available, and, accordingly, is most often used.

Typical examples of functional derivatives of bisphenols which can be used are the metal salts thereof and the diesters thereof with aliphatic monocarboxylic acids containing 1 to 3 carbon atoms. Preferred functional derivatives of the bisphenols are the sodium salts, the potassium salts, and the diacetate esters thereof. The bisphenols may be used either alone or as a mixture of two or more thereof.

While any known method can be used to produce these aromatic polyesters, including the interfacial polymerization method which comprises mixing a solution of an aromatic dicarboxylic acid chloride in a water-immiscible organic solvent with an alkaline aqueous solution of bisphenol, and the solution polymerization method which comprises heating a bisphenol and an acid chloride in an organic solvent, the melt polymerization method which comprises heating a diester of an aromatic dicarboxylic acid and bisphenol, is the polymerization method of particular concern in this invention.

In order to insure the aromatic polyesters have good physical properties they should have an intrinsic viscosity (IV) of about 0.3 to about 1.0, preferably 0.4 to 0.8, determined in 1,1,2,2-tetrachloroethane at 30° C.

The polymerization process is carried out in the presence of an acidic, neutral or basic catalyst, such classifications being based on the reaction of a conventional acid-base indicator and the catalyst when the latter is dissolved in a polar ionizing solvent such as water. More preferably, a basic catalyst is employed. Prior to its introduction into the reaction mass, the preferred basic catalyst is preferably converted to liquid form, e.g. by melting or by dissolution in a liquid or normally solid, low melting solvent. Suitable basic catalysts include the alkali metals, such as lithium, sodium, potassium, rubidium, cesium and francium and the carbonates, hydroxides, hydrides, borohydrides, phenates, bisphenates, (i.e. salt of a phenol or bisphenol), carboxylates such as acetate or benzoate, oxides of the foregoing alkali metals. Group II and III elements can also be used in place of the alkali metals of the foregoing classes of compounds such as metals and compounds of calcium, magnesium and aluminum. Other bases include trialkyl or triaryl tin hydroxides, acetates, phenates, and the like. Examples of catalysts are lithium, sodium, potassium, rubidium, cesium and francium metals, potassium or rubidium carbonate, potassium hydroxide, lithium hydride, sodium borohydride, potassium borohydride, calcium acetate, magnesium acetate, aluminum triisopropoxide and triphenyl tin hydroxide.

Phenol is the preferred solvent for the normally solid catalysts. Substituted phenols which can be used include those having the formula $O-R_n$ wherein R is alkyl of 1 to 10 carbon atoms, alkoxy of 1 to 10 carbon atoms, aryl of 6 to 10 carbon atoms, chloro, bromo or mixtures thereof, and wherein n is 1 or 2. Typical solvents include o-benzyl phenol, o-bromo phenol, m-bromo phenol, m-chloro phenol, p-chloro phenol, 2,4 dibromo phenol, 2,6 dichloro phenol, 3,5 dimethoxy phenol, o-ethoxy phenol, m-ethyl phenol, p-ethyl-phenol, o-isopropyl phenol, m-methoxy phenol, m-propyl phenol, p-propyl phenol, and the like. Other solvents which are particularly useful are of the ether type, for example, tetrahydrofuran and the various glymes, for examples, ethylene glycol dimethylether and the like.

Especially preferred liquid basic catalysts are charged dissolved in a molten normal solid-low melting organic solvent such as phenol. Especially preferred catalysts providing excellent results are the basic catalysts, rubidium phenoxide, potassium phenoxide, and potassium borohydride, each dissolved in molten phenol.

In accordance with conventional reaction practice, a catalytically effective amount of the catalyst is employed, for example, about 0.005 to about 2 mol percent or more, preferably about 0.01 to 1 mole percent of the bisphenol in accordance with known techniques of polyester formation.

In synthesizing the polyarylates useful in this invention, conditions which are conventional for melt transesterification polymerization are especially preferred. According to the conventional practice, the solid reactants are heated above about 100° C., preferably above about 160° C. to melt the reactants. Onset of reaction in the presence of catalyst is generally at a temperature ranging from above about 100° C. to about 275° C., for example, above about 160° C. for reaction of Bisphenol A, diphenyl terephthalate and diphenyl isophthalate. The reaction temperature employed is generally above about 100° C. to about 400° C. or higher, preferably above about 175° C. to about 350° C., more preferably about 175° C. to about 330° C. with the reaction temperature being raised gradually during the polymerization. In the reaction, the aryl group of the diester is displaced as the corresponding relatively volatile monohydroxy aromatic compound, e.g. phenol, for which provision is made for removal e.g. by distillation from the reaction mixture during the transesterification. Reaction pressure is generally diminished during the reaction, e.g. of about 0.1 mm. of mercury or lower, to aid in the aforementioned removal of the monohydroxy aromatic compound.

Generally, it is preferable in accordance with the prior art to carry out reaction in two stages. The first or prepolymerization stage is carried out at above about 100° C. to about 350° C. preferably about 160° C. to about 330° C., especially about 180° C. to about 300° C. to prepare a low molecular weight polyester or prepolymer of relatively low intrinsic viscosity, e.g. of less than about 0.1 to about 0.3 dl./g. A subsequent polymerization stage is then carried out in which the prepolymer is heated at a somewhat higher temperature namely, at above about 200° C. to about 400° C. or higher, preferably at about 225° C. to about 350° C., especially at about 275° C. to about 330° C. Conveniently, the polymerization stage is carried out in a different reaction vessel from that employed in the prepolymerization reaction stage with effective agitation of reaction mixture in both stages with generally more extreme agitation being used in the polymerization.

In carrying out the melt polymerization, it is preferred prior to catalyst addition to melt the normally solid reactants to provide molten reactants and then heat the reactants if necessary to a temperature sufficient for onset of polymerization. According to this embodiment, a basic catalyst for the polymerization that is normally solid at 30° C. is then introduced in the liquid form to the polymerization concurrent with the molten reactants.

The cobalt salts useful in the present invention are the cobalt esters of $C_3$-$C_{20}$ aliphatic or iso-aliphatic carboxylic acids. Examples of particularly useful cobalt salts include cobalt 2-ethylhexanoate, cobalt neodecanoate and cobalt stearate. The cobalt salts are preferably added to the monomer mixture after the monomers have been melted. Subsequent to melting and the inclusion of the cobalt salt, the transesterification catalyst is added.

Many of useful the cobalt salts are only partially soluble in the molten polymerization mixture of monomers used to form the polyarylate by the melt transesterification reaction. It has now been found that these cobalt salts can be predissolved in a conventional solvent and then added to the molten monomer mixture. This has resulted in complete solubility of the cobalt salt in the molten monomer mixture and provides uniform polyarylate color without the formation of residual specks in the final product. Any conventional solvent is likely to achieve the desired result. Thus, aromatic solvents such as toluene, xylene, etc. and alkyl alcohol solvents can be used. However, caution must be exercised when lower boiling solvents are used inasmuch as flashing of the solvent upon injection into the molten monomer mixture will cause splattering of the cobalt salt onto the walls of the reaction vessel. It is difficult to place the cobalt salt back into solution with the monomers and, thus, polyarylate color and quality will not be improved. It has been found that toluene is a particularly preferred solvent.

What has been found interesting is the fact that the ligand which forms the cobalt salt is important in achieving the desired color balance of the polyarylate as formed. This is unexpected inasmuch as it was thought that the cobalt component and the amount thereof were the sole factors in determining the ultimate color of the polymer The amount of the cobalt salt will generally comprise from about 1 to about 80 ppm cobalt per weight of the polymer. Preferably about 1 to about 50 ppm cobalt and more preferably from about 1 to about 40 ppm cobalt can be utilized. The optimum amount of cobalt added will vary depending on the particular ligand used to form the cobalt salt but, will generally fall within the broad and preferred ranges set out immediately above. If a solvent is needed to completely dissolve the cobalt salt, sufficient solvent should be provided to yield about 0.5–10% and, preferably, 0.5–3% metallic cobalt in the solution.

The following examples are set forth to further illustrate the present invention and are not to be construed as limiting the invention thereto.

EXAMPLE I

This example is intended to illustrate the relative solubility of various cobalt salts in a molten monomer mixture of bisphenol A, diphenyl terephthalate and diphenyl isophthalate.

A monomer mixture comprising 22.83 grams of bisphenol A and 31.89 grams of a mixture of diphenyl terephthalate and diphenyl isophthalate was melted and various cobalt salts added thereto. The amount of cobalt salt added to the molten monomer mixture was calculated to result in 80 ppm of metallic cobalt in the final polymer. Table 1 below lists the cobalt salt which was utilized, the amount of cobalt as metal contained in the cobalt salt and the weight of cobalt which was added to the molten monomer mixture and calculated to provide 80 ppm of cobalt in the final polymer. The relative solubility of the salt in the molten monomer mixture and the color of the monomer mixture upon addition of the salt are also discussed in Table 1. It should be noted that the monomer mixture was not polymerized in this example.

TABLE I

| Cobalt Compound | Weight Percent Cobalt | Cobalt Weight to Yield 80 ppm Cobalt in Polymer |
|---|---|---|
| 1. Cobalt 2-Ethyl Hexanoate | 12.0% | 0.0237 |
| 2. Cobalt Naphthoate | 10.5% | 0.0271 |
| 3. Cobalt Stearate | 9.4% | 0.0302 |
| 4. Cobalt Hydroxide | 63.4% | 0.0045 |
| 5. Cobalt Benzoate | 17.6% | 0.0145 |
| 6. Cobalt Neodecanoate | 20.5% | 0.0139 |
| 7. Cobalt Formate | 31.8% | 0.0089 |

1. Partial solubilization - numerous unsolubilized particles. Color - dark purple. Mixture slow to solidify upon cooling.
2. Complete solubilization. Color - light violet. Mixture slow to solidify.
3. Some solubilization - took place at very slow rate, particles present in suspension. Mixture solidified rapidly upon cooling.
4. No solubilization. Color - clear.
5. Very slight solubilization. Color - a very light blue.
6. Partial solubility. Blue particles in suspension.
7. No solubilization.

As can be seen from Table I, the cobalt 2-ethyl hexanoate, cobalt stearate, and cobalt neodecanoate are at least partially soluble in the monomer mixture. At the amount of cobalt added, however, it is clear that predissolving the cobalt salt is necessary to improve solubilization. It is important to note that at the amount of cobalt salt added, the cobalt benzoate was only very slightly soluble in the monomer mixture and, at such levels, would likely provide a polymer of poor color and would yield specks of the salt in the formed polymer.

It was found further that even at lower levels of the cobalt, the cobalt 2-ethyl hexanoate and the cobalt neodecanoate were still only partially soluble in the monomer mixture. Inasmuch as it is preferred to provide complete solubilization of the cobalt salt in the monomer mixture to provide improved color and product quality, the use of an additional solvent is needed to provide complete solubility.

EXAMPLE II

The effect of cobalt 2-ethyl hexanoate on polyarylate color was examined. In this example, a polyarylate was formed by melt transesterification from a reaction mixture of 22.83 grams of bisphenol A and 31.89 grams of a mixture of diphenyl terephthalate and diphenyl isophthalate. Cobalt 2-ethyl hexanoate was dissolved in sufficient toluene to yield a solution containing 1.2 weight percent cobalt as metal. Several runs were made in which the amount of the cobalt salt added to the monomer mixture was varied to determine the effect of cobalt salt concentration on polyarylate color. The catalyst used was approximately 0.14 cc potassium phenate in phenol. The catalyst was present in an amount of 0.05 mole % based on the bisphenol A.

The monomers were dried and added to the reaction vessel. The vessel was purged with argon at a temperature up to 200° C. After melting, the cobalt salt solution was injected into the molten mixture. Subsequently, the potassium catalyst was added. Generally, all runs were performed in the same manner with the temperature of reaction comprising about 210° C. for the first one-half hour, 240° C. for one-half hour and 30020 C. for a final half hour. The Intrinsic Viscosity of all formed polyarylate samples ranged from 0.5 to 0.55. The polymer was measured for light transmission, Yellowness Index, and Hunter Color on the L, a and b scales.

The results for Yellowness Index and light transmission are shown in FIG. 1 while the Hunter a and b color values are shown in FIG. 2 relative to the amount of cobalt added. The value of the cobalt which is shown on the graphs in each Figure represents the amount of metallic cobalt relative to the weight of the polymer formed.

Referring to FIG. 1, it can be seen that the light transmission of the polyarylate formed with cobalt octoate remained fairly good up to 80 ppm of cobalt. Preferably, it can be seen that light transmission remained fairly steady up to about 45 ppm cobalt. More preferably, for the cobalt 2-ethyl hexanoate salt, up to about 30 ppm cobalt appears to give the best results. This is also consistent with FIG. 2 where the color balance of the polyarylate sample seems to be best at cobalt levels up to about 45 ppm with preferred values ranging up to 30 and more preferably up to 20 ppm cobalt.

What is claimed is:

1. In a method of preparing an aromatic polyester from a molten reaction mixture of monomers comprising an aromatic dicarboxylic acid diester and a bisphenol, and wherein a polymerization catalyst is added to the reaction mixture, the improvement which comprises: improving the color of the formed aromatic polyester by adding to said molten monomeric reaction mixture a cobalt salt comprising a cobalt ester of an aliphatic or iso-aliphatic carboxylic acid which contains 3 to 20 carbon atoms.

2. The method of claim 1 wherein said bisphenol is bisphenol A.

3. The method of claim 1 wherein said aromatic dicarboxylic acid diester is a diaryl ester of terephthalic acid, isophthalic acid or a mixture thereof.

4. The method of claim 1 wherein said cobalt salt comprises cobalt 2-ethyl hexanoate.

5. The method of claim 3 wherein said cobalt salt is cobalt 2-ethyl hexanoate.

6. The method of claim 1 wherein said cobalt salt is predissolved in a solvent prior to addition to said reaction mixture.

7. The method of claim 5 wherein said cobalt salt is predissolved in a solvent prior to addition to said reaction mixture.

8. The method of claim 7 wherein said solvent is toluene.

9. The method of claim 6 wherein the cobalt salt is present in said solvent in an amount of from about 0.5–10% by weight metallic cobalt.

10. The method of claim 9 wherein the cobalt salt is present in said solvent in an amount of from about 0.5 to 3 weight percent metallic cobalt.

11. The method of claim 3 wherein said catalyst is a transesterification catalyst containing an alkali metal.

12. The method of claim 11 wherein said catalyst is a potassium-containing catalyst.

13. The method of claim 12 wherein said catalyst is potassium phenate.

14. The method of claim 11 wherein said cobalt salt is cobalt 2-ethyl hexanoate.

15. The method of claim 12 wherein said cobalt salt is cobalt 2-ethyl hexanoate.

16. The method of claim 13 wherein said cobalt salt is cobalt 2-ethyl hexanoate.

17. The method of claim 3 wherein said cobalt salt is present in amounts of up to about 80 ppm cobalt relative to the weight of the polyarylate.

18. The method of claim 5 wherein said cobalt salt is present in amounts of up to about 45 ppm cobalt relative to the weight of the polyarylate.

19. The method of claim 18 wherein said cobalt salt is present in amounts of up to about 30 ppm cobalt relative to the weight of the polyarylate.

20. The method of claim 3 wherein said bisphenol compound is bisphenol A.

21. The method of claim 13 wherein said potassium catalyst is added to said molten reaction mixture subsequent to the addition of said cobalt salt.

* * * * *